United States Patent [19]

Hotta et al.

[11] 4,020,264
[45] Apr. 26, 1977

[54] CRYSTALLINE POLYOLEFINS AND PRODUCTION THEREOF

[75] Inventors: Junichi Hotta; Masaki Fujii, both of Yokkaichi, Japan

[73] Assignee: Mitsubishi Petrochemical Company Limited, Japan

[22] Filed: Dec. 20, 1971

[21] Appl. No.: 210,194

Related U.S. Application Data

[63] Continuation-in-part of Ser. No. 45,269, June 10, 1970, abandoned.

[30] Foreign Application Priority Data

June 19, 1969 Japan .............................. 44-48605

[52] U.S. Cl. ........................... 526/142; 252/429 B; 260/878 B; 526/348; 526/351; 526/906
[51] Int. Cl.² ...................... C08F 4/66; C08F 10/06
[58] Field of Search ............... 252/429 B; 260/88.2, 260/93.7, 94.9 C; 526/142

[56] References Cited

UNITED STATES PATENTS

| | | | |
|---|---|---|---|
| 3,622,552 | 11/1971 | Fukuda et al. | 260/94.9 C |
| 3,639,375 | 2/1972 | Staizer et al. | 260/94.9 C |

FOREIGN PATENTS OR APPLICATIONS

| | | | |
|---|---|---|---|
| 2,029,890 | 12/1970 | Germany | 260/94.9 C |
| 1,128,090 | 9/1968 | United Kingdom | 260/94.9 C |

*Primary Examiner*—Edward J. Smith
*Attorney, Agent, or Firm*—Robert E. Burns; Emmanuel J. Lobato; Bruce L. Adams

[57] ABSTRACT

Crystalline polyolefins of high molecular weight and high crystallinity are produced in high yields by polymerizing an olefin in the presence of a catalytic system comprising a combination of an organoaluminum compound and a modified titanium composition which has been prepared by milling together a halogen compound of titanium of a valence lower than the maximum valence (e.g. titanium trichloride) and an α, β-unsaturated carboxylate ester.

15 Claims, No Drawings

CRYSTALLINE POLYOLEFINS AND PRODUCTION THEREOF

CROSS-REFERENCE TO RELATED APPLICATION

This application is a continuation-in-part of our copending application Ser. No. 45269, filed June 10, 1970, entitled "CRYSTALLINE POLYOLEFINS AND PRODUCTION THEREOF" now abandoned.

BACKGROUND OF THE INVENTION

This invention relates generally to crystalline olefin polymers and production thereof and more particularly to a new and advanced process for producing crystalline olefin polymers.

The term "polymer" as used in this specification, including the claims, is intended to include homopolymers and copolymers unless otherwise specified.

It is well known that crystalline polyolefins can be obtained, in general, by polymerizing olefins in the presence of catalytic systems comprising organometallic compounds of metals of group 1, 2, and 3 of Mendelejeff's periodic table and halogen compounds of transition metals of group 4, 5, and 6 of the periodic table in the presence of an inert solvent.

It is also known that, in order to produce the crystalline polyolefins in high yields in such cases, combinations of organoaluminum compounds as the organometallic compounds and titanium compounds of lower valence then the maximum valence, e.g., titanium trichloride, as the halogen compounds of transition metals are being used in an industrially advantageous manner.

However, according to the results of our experiments, for example, when a catalyst system comprising triethyl aluminum and titanium trichloride is used in the homopolymerization of propylene, the quantity of matter insoluble in boiling heptane, i.e., the crystalline polymer, is from 70 to 85 percent of the total polymer formed. Furthermore, when a catalytic system comprising diethylaluminium chloride and titanium trichloride is used, the quantity of the above mentioned boiling heptane insoluble matter is from 85 to 90 percent, this proportion of the boiling heptane insoluble matter being known as the isotactic index (II).

Thus, even when a catalytic system of a combination which, among Ziegler type catalysts, is thought to form a relatively small proportion of boiling heptane soluble matter is selected, the proportion of the boiling heptane soluble matter relative to the total polymer formed is still from 5 to 30 percent.

In the production of a copolymer of two or more monomers, for example, in the case where propylene and ethylene are caused to undergo copolymerization, an increase in the ethylene content gives rise to an abrupt increase in the by-product quantity of non-crystalline copolymer, whereby there is a marked decrease in the yield of the crystalline polymer.

According to the results of our experiments, in the case where the ethylene content within an ethylene/propylene copolymer obtained is 2 percent, the quantity of the boiling heptane insoluble matter is from 40 to 60 percent of that of the total polymer formed when a catalytic system comprising triethyl aluminum and titanium trichloride is used. Furthermore, when a catalytic system comprising diethyl aluminum chloride and titanium trichloride is used, the quantity of the above mentioned boiling heptane insoluble matter is from 55 to 75 percent.

A polymer which dissolves in boiling heptane is ordinarily non-crystalline and, at present, is not known to have any suitable use. Furthermore, the formation as a by-product of this unnecessary non-crystalline polymer during the production of a crystalline polymer gives rise not only to an unnecessary consumption of the monomer but also to the necessity of extracting and removing the non-crystalline polymer from the polymer formed. Consequently, great industrial disadvantages such as complication of process and the necessity of increasing the equipment capacity or the number of machines are incurred.

Moreover, in cases where the proportion of matter soluble in boiling heptane becomes greater than 50 percent relative to the total polymer formed, various difficulties are encountered, although differing with the production process. In the ordinary process for producing polyolefins, difficulties such as an increase in the viscosity of the polymer slurry give rise to defective operation such as difficulty of removal of heat from the polymerization apparatus, clogging of piping, and lowering of operational capacity, whereby practical production on a commercial basis becomes impossible.

Accordingly, the discovery of a catalytic system, the use of which results in the formation of a small proportion of the non-crystalline polymer, would be of great industrial value. However, even if it causes the production of a small proportion of the non-crystalline polymer, a catalytic system cannot be utilised in an industrially advantageous manner if it gives rise to deleterious effects such as a remarkably adverse effect on the molecular weight of the polymer obtained, a drop in the polymerization velocity, or a lowering of the bulk density of the solid polymer obtained.

SUMMARY OF THE INVENTION

It is an object of the present invention to overcome the above described difficulties encountered in the prior art and to provide crystaline olefin polymers of high molecular weight and high crystallinity.

Another object of the invention is to provide a commercially advantageous process for producing in a high yield polymers of the above stated character.

A further object of the invention is to provide an effective catalytic system suitable for use in accordance with the invention.

We have found that the above object can be achieved by using, as the halogen compound of titanium of a lower valence than the maximum valence to be combined with the organoaluminum compound, a modified titanium halogen composition which has been treated in a specific manner as described hereinafter.

According to the present invention, briefly summarised, there is provided a process for producing crystalline olefin polymers in which an olefin is polymerized in the presence of a catalytic system comprising, in combination, an organoaluminum compound (1) and a modified titanium composition (2) which has been prepared by mill-processing a halogen compound of titanium of a valence lower than the maximum valence together with an $\alpha, \beta$-unsaturated carboxylate ester.

The nature, details, and utility of the invention will be more clearly apparent from the following detailed description beginning with general considerations and concluding with specific examples of practice illustrating preferred embodiments of the invention.

DETAILED DESCRIPTION

One of the most important features of the present invention is the use of a modified titanium halide as the titanium composition in the catalytic system for the production of polyolefins.

The use of such a modified titanium halide composition results, in general, in a product of a higher isotactic index (II) than the use of an unmodified titanium halide. Furthermore, the effect of increase in this index II is greater than in the case where a modifier compound is merely added to the system of the organic aluminium compound and titanium halide compound. In other terms, a smaller quantity of the modifier compound is required for the same effect of increase of the index II when it is incorporated by milling with the titanium halide.

As mentioned hereinabove, the modifier according to the invention is an $\alpha$, $\beta$-unsaturated carboxylate ester, examples of which are as follows. In addition to the basic acrylate esters, there are $\alpha$ - and/or $\beta$ - substituted acrylic esters. Furthermore, there are unsaturated carboxylate esters having at least one carboxylate ester group at the $\alpha$ position with respect to an ethylenic double bond (e.g., maleate diesters). As desirable $\alpha$ - and/or $\beta$ - substituents, there are lower alkyl groups (preferably with at most 8 carbon atoms) and phenyl and tolyl groups, monovalent lower alkanols being desirable as the alcoholic constituent of the ester.

Of these esters, lower alkyl acrylates are preferable. Specific examples are methyl acrylate, ethyl acrylate, butyl acrylate, 2-ethyl-hexyl acrylate, methyl methacrylate, ethyl methacrylate, isobutyl methacrylate, dimethyl fumarate, diethyl fumarate, dimethyl maleate, diethyl maleate, methyl cinnamate, ethyl cinnamate, methyl (iso)crotonate, ethyl (iso)crotonate, dimethyl itaconate, diethyl itaconate.

The titanium compound to be modified by a compound of the above defined character is a halogen compound of titanium of a valence lower than the maximum valence. Such a halogen compound is ordinarily prepared by reducing a halogen compound of titanium of maximum valence. Examples of suitable reducing agents are hydrogen, aluminum metal, titanium, metal hydrides, and organometallic compounds (e.g., trialkyl aluminum and dialkylaluminum halide which are organoaluminum compounds). The reducing operation may be carried out by any appropriate method. Probably the most generally feasible method is to accomplish the reducing process by mill processing in a substantially inert atmosphere.

Preferably, the reduced titanium compound is that which is produced by reduction of $TiCl_4$ with aluminum and which is believed to have the general formula: $3TiCl_3 \cdot AlCl_3$. The term "titanium trichloride" used herein is intended to include such an addition compound and those which have been modified by other gaseous, liquid or solid modifiers.

One representative example of a "halogen compound of titanium of a valence lower than the maximum valence" prepared by the reduction process is titanium trichloride (the description hereinafter being set forth with respect to titanium trichloride as representing halogen compounds of titanium). The material thus obtained by the reduction process is then subjected to a modification process according to the invention either directly in its original state as obtained or after removal thereofrom of any excess of reducing agent and 1 or oxidised compounds of the reducing agent.

The process for modifying the titanium compound thus obtained by the use of the modifier is carried out by subjecting the two compounds to mill processing. The term "mill processing" is herein used to include any method and equipment, such as ball milling and vibration milling, whereby the two compounds can be mixed and pulverised. This mill processing, in general, is carried out in a substantially inert atmosphere. The mill processing of the titanium compound with the modifier is usually carried out at a temperature ranging from $-30°$ to $+50°$ C, lower temperatures being preferable when the quantity of the modifier is large.

While the processing time differs with the mill processing efficiency and the kinds of the modifier and the titanium halogen compound, it is preferably continued from one hour to a milling number of tens of hours, in general. We have found that, in general, a process of over 100 hours does not appreciably increase the effectiveness of the treatment, whereby an excessively long processing time is not advantageous. The quantity of the modifier (b) is, in general, 0.1 to 50 percent by weight of that of the titanium trichloride (a), the ratio (b)/(a) being 0.001 to 0.5, preferably 1 to 30 percent by weight, the ratio (b)/(a) being 0.01 to 0.3, and more preferably 3 to 20 percent by weight, the ratio (b)/(a) being 0.03 to 0.2.

The conventional titanium compound which has been reduced and is to be employed as one component in Ziegler type catalyst is usually ground or milled in order to improve the activity of the resulting catalyst for at least a number of tens of hours. Such grinding or milling can be carried out before, simultaneously with, or after the mill processing according to the present invention. The duration of the conventional grinding or milling can be selected independently to that of the mill processing according to the invention.

The modified titanium composition (2) obtained in this manner is combined with an organoaluminum compound (1) to form a Ziegler type catalyst as mentioned hereinbefore. For this organic aluminum compound, any such compound which is usable in this type of catalyst can be utilised. Specific examples are compounds (used singly or as mixtures) which can be represented by the general formula $Al\ R_n\ X_{3-n}$, wherein: R is an alkyl or an aralkyl group; X is a halogen or an alkoxy group; n is 3, 2, 1.5, or 1. Lower alkyl groups or alkyl parts (at the most 6 carbon atoms) are especialy suitable. Of these compounds, those representable by the formula $Al\ R_2X$ are preferable.

A Ziegler type catalyst for use in accordance with the present invention is a combination of the above described organoaluminum compound (1) and modified titanium halide composition (2). While the proportions of these two components may be selected at will, specific values in practice in terms of the weight ratio (1)/(2) are of the order to from 0.5 to 20, particularly from 1 to 5.

It is known that a Ziegler type catalyst, in general, can be modified with a third component, such as an electron donor compound, other than the organoaluminum compound and the modified titanium halide compound, which are the two indispensable components. A "catalytic system comprising the combination of an organoaluminum composition (1) and a modified titanium compound (2)" according to the invention is intended to include systems which have been modified by a third component as mentioned above.

The process according to the invention can be applied to production of homopolymers and copolymers of propylene. In the case of production of propylene copolymers, ethylene is used as a comonomer, and typical propylene copolymers are those containing up to approximately 10% by weight of copolymerized ethylene. The copolymers can be both random copolymers in which copolymerized ethylene is distributed randomly in a copolymer chain, and block copolymers which are mutually combined at least two polymer segments selected from group consisting of propylene polymer, ethylene polymer and ethylene-propylene random copolymer segments. Such copolymers can be produced with a mixture of propylene and ethylene, the mean ethylene content over a copolymerization being less than 10% by mole of the mixture.

Except for the above points, the process of the invention may be carried out in accordance with any method which can be applied to a polymerization reaction of the instant character. Accordingly, the process may be carried out by a method such as gas-phase polymerization, liquid-phase polymerization in which the monomer itself functions as a solvent, or liquid-phase polymerization within a common solvent or dispersing medium, at a temperature of the order of from 0° to 100° C (preferably from 50° to 90° C), under a pressure of the order of from 0 to 100 atmospheres (preferably from 0 to 40 atmospheres), in the presence of, or not in the presence of, an agent, such as hydrogen, for adjusting the molecular weight, and by a batch or continuous procedure.

The most general process entails the use of an aliphatic, alicyclic, or aromatic hydrocarbon, or a mixture thereof, such as hexane, heptane, cyclohexane, and toluene, as a solvent and the recovery of the product in the form of a slurry.

In order to indicate still more fully the nature and utility of the invention, the following examples of practice constituting preferred embodiments of the invention are set forth, it being understood that these examples are presented as illustrative only and that they are not intended to limit the scope of the invention.

EXAMPLE 1

1. Preparation of the modified titanium trichloride

Titanium trichloride sold on the market (product TAC-101 produced by Toho Titanium Co., Japan, in this case) was placed in a nitrogen atmosphere within a miniature vibration mill of an internal volume of 0.6 liter, and steel balls each of 15-mm. diameter were introduced into the mill until they occupied two-thirds of the mill interior volume. A specific quantity of methyl methacrylate was then measured and added to the process batch by means of an injection device. The process materials were then subjected to a mixing and milling process at room temperature for 10 hours. A total of six modified titanium trichloride samples were thus prepared with respectively different quantities of the added methyl methacrylate.

2. Polymerization of propylene

Homopolymerization of propylene was carried out by using a 1-liter autoclave under the following polymerization conditions.

| A modified titanium trichloride | 0.315 | g. |
|---|---|---|
| Diethyl aluminum chloride | 0.536 | g. |
| Heptane | 450 | ml. |
| Hydrogen | 300 | ml. |
| Temperature | 70 | °C |
| Pressure | 6 | kg/cm².gauge. |
| Time | 6 | hours |

After polymerization, the catalyst was decomposed (by using butanol), the process batch was filtered and the polymer cake obtained was dried to produce a polypropylene powder. A total of six polypropylene powders for tesing were thus produced.

The test results of this example are indicated in Table 1.

Table 1.

| Methyl methacrylate added (% by wt.) | Activity (polypropylene(g) modified titanium trichloride (g) per hour) | Isotactic Index, II (% by wt.) | Bulk Density (g/cc) |
|---|---|---|---|
| 0 | 132 | 89.0 | 0.34 |
| 0.86 | 166 | 90.6 | 0.38 |
| 1.71 | 152 | 90.3 | 0.37 |
| 3.42 | 160 | 92.2 | 0.38 |
| 6.84 | 170 | 94.3 | 0.40 |
| 6.84* | 141 | 92.0 | 0.35 |

EXAMPLE 1A

The procedure of Example 1 was followed with the use of an increased quantity of methyl methacrylate in preparation of the modified titanium trichloride.

The results are indicated in Table 1A.

Table 1A.

| Methyl methacrylate added (% by wt.) | Activity (polypropylene (g) titanium trichloride (g) per hour) | Isotactic Index, II (% by wt.) | Bulk Density (g/cc) |
|---|---|---|---|
| 10.0 | 138 | 96.8 | 0.40 |
| 12.0 | 137 | 97.0 | 0.39 |
| 18.0 | 121 | 92.3 | 0.40 |
| 25.0 | 75 | 92.1 | 0.40 |

EXAMPLE 2

A stainless-steel autoclave of a capacity of 1-liter having agitating and temperature-control devices was flushed by repeated cycles of alternate evacuation and filling with nitrogen. The autoclave was then charged with 450 cc. of heptane, 0.536 g. of diethylaluminum chloride, and 0.314 g. of titanium trichloride pulverised together with methyl methacrylate (MMA) (the pulverising conditions being: 3 percent by weight based on the titanium trichloride of MMA added; temperatures 5° to 10° C; and time 10 hours in a vibration mill), and hydrogen in a quantity of 300 cc. as converted to standard atmospheric conditions was introduced into the autoclave.

Then, while the autoclave interior was maintained at 25° C, and propylene was supplied thereinto so as to maintain a constant pressure therein of 2 kg./cm². gauge, prepolymerization was carried out for 0.5 hour. Thereafter, the autoclave temperature was raised to 70° C, and then, as propylene was supplied into the autoclave to maintain a constant pressure at 6 kg./cm². gauge, polymerization was carried out for 6 hours.

Upon completion of the polymerization, 50 cc. of methanol was added to the resulting contents of the autoclave, which were thus processed at 70° C for 2 hours. A polymer cake was separated by filtration from the resulting materials and was dried for 6 hours in a vacuum at 60° C.

As a result, a white solid polymer was produced and found to have a weight 285.7 g., and the component thereof insoluble in boiling heptane was 93.4 percent of the total polymer formed. The bulk density of this white solid polymer was 0.421 g./cc.

EXAMPLE 3

Tests were carried out on various $\alpha, \beta$ - unsaturated carboxylate esters in producing polyolefins according to the invention. The ball-milling conditions, polymerisation conditions, and results were as indicated in Table 2.

then charged with 50g of polypropylene powder as a base polymer and 1.25g of diethylaluminum chloride, then with 12.5 ml of a slurry in 1-liter of hexane of 40 g of titanium trichloride composition ($Ti_3AlCl_{12}$) which had been pulverized with MMA, the quantity of MMA being 8% by weight of the titanium trichloride and then with hydrogen.

The content of the autoclave was continuously fed with gaseous propylene under stirring, and the polymerization was conducted for 3 hrs. at 75° C under 25 kg/cm².

Upon completion of the polymerization, propylene in the autoclave was purged out to atmospheric pressure and there was obtained 1,050 g of a solid polymer after correction in view of amount of the base polymer.

The polymer thus produced was subjected to extraction with boiling n-heptane for 24 hrs.; the I.I. of the polymer was found to be 95.5% after correction in view Table 2.

| CATALYST Modified titanium chloride | | | | | | | | | POLYMER QUANTITY | | | CATALYST YIELD POLYMER (g.) modified titanium trichloride(g.) | ISOTACTIC INDEX II (wt. %) | | BULK DENSITY (g./cc.) |
|---|---|---|---|---|---|---|---|---|---|---|---|---|---|---|---|
| Ball-Milling conditions | | Modified titanium trichloride quantity (g.) | *1 DEAC (g.) | POLYMERIZATION CONDITIONS *2 | | | | | Component insoluble in heptane (g.) | Total (g.) | | | | | |
| $\alpha,\beta$-unsaturated carboxylate ester | Quantity added (wt. %) | Process time (hr.) | | | Hydrogen (ml) | Temperature (° C) | Pressure kg./cm² gauge | Time (hr.) | Product (g.) | | | | | Product | Total |
| methyl cinnamate | 3 | 8 | 0.3120 | 0.536 | 300 | 73.5 – 57.0 | 6 | 6 | 214.4 | 10.8 | 225.2 | 722 | 95.4 | 90.8 | 0.313 |
| methyl crotonate | 3 | 8 | 0.3125 | 0.536 | 300 | 73.0 – 59.5 | 6 | 6 | 274.5 | 9.6 | 284.1 | 909 | 96.9 | 93.3 | 0.409 |
| butyl acrylate | 5 | 16 | 0.3373 | 0.536 | 300 | Max.78 | 6 | 6 | 198.4 | 10.2 | 208.6 | 618 | 96.8 | 92.0 | 0.406 |
| 2-ethylhexyl acrylate | 5 | 16 | 0.3083 | 0.536 | 300 | Max.78 | 6 | 6 | 246.0 | 13.5 | 259.5 | 842 | 98.0 | 92.9 | 0.369 |

*1 DEAC = diethylaluminum chloride
*2 Quantity of heptane used = 450 ml.

EXAMPLE 4

This example shows a liquid-phase, solvent-free polymerization of propylene.

A stainless steel autoclave of a capacity of 3-liter having agitating device was flushed by three cycles of alternate evacuation and filling with nitrogen under reduced pressure (2 to 3 mmHg). The autoclave was then charged with 1.25g of diethylaluminum chloride, then with 12.5 ml of a slurry in 1-liter hexane of 40 g of titanium trichloride composition which had been pulverized with MMA, the quantity of MMA being 8% by weight of the titanium trichloride, and then with 1-liter of hydrogen and 2.5-liter of liquefied propylene under pressure.

The content of the autoclave was agitated at 65° C, and the polymerization was conducted for 3 hours.

The quantity of polypropylene thus produced was 1,130 g, and I.I. was 95.3% and the bulk density was 0.45 g/c.c.

EXAMPLE 5

This example shows a gas-phase polymerization of propylene.

A stainless steel autoclave of a capacity of 3-liter having agitating device was flushed by three cycles of alternate evacuation and filling with nitrogen under reduced pressure (2 to 3 mmHg). The autoclave was of the I.I. value of the base polymer. The bulk density of the solid polypropylene was 0.46 g/cc.

The same procedure was followed for several times except for the quantity of MMA used.

The results of this example are indicated in Table 3.

Table 3.

| Methyl methacrylate added (% by wt.) | Activity (polypropylene(g) titanium trichloride(g) per hour) | Isotactic Index, II (% by wt.) | Bulk Density (g/cc) |
|---|---|---|---|
| 0 | 533 | 89.0 | 0.45 |
| 5.0 | 631 | 93.0 | 0.45 |
| 8.0 | 725 | 95.5 | 0.46 |
| 10.0 | 741 | 96.5 | 0.46 |
| 14.0 | 663 | 99.0 | 0.47 |
| 16.0 | 595 | 99.9 | 0.47 |
| 25.0 | 437 | 96.5 | 0.38 |

EXAMPLE 6

1. Preparation of the modified titanium trichloride

The procedure of Example 1-(1) was followed.

2. Two-step copolymerization (polymerization of propylene for the first step and co-polymerization of ethylene and propylene for the second)

Into a 100-l. stainless-steel autoclave provided with stirring means and temperature controlling means, 40 l.(liter) of heptane, 64 g. of AlEt$_2$Cl, and 32 g. of titanium-containing solid product identical to that of Example 1 were charged.

After the autoclave was heated to 65° C, propylene and a small amount of hydrogen were fed thereinto, and then the polymerization was carried out under a pressure of 5 kg/cm$^2$ G.

Further, the unreacted gas was removed from the autoclave to 0 kg/cm$^2$ G. Then a mixed gas of ethylene and propylene was fed at a mole ratio of 5:1, and the polymerization was carried out at 65° C under a pressure of 3 kg/cm$^2$ G for 0.4 hour.

At the end of the polymerization, 1.5 l. of butanol was added to the process materials which were then treated at 70° C for 2 hours. After this treatment, the polymer slurry was separated from the solvent by a centrifugal separator, and the polymer cake thus obtained was dried under vacuum at 70° C for 6 hours.

As a result, 620 g. of a white solid polymer per gram of the solid titanium-containing component was obtained.

The total II of this polymer was 90.5%, the MI was 5.3, and the ethylene content was 7.0% by weight.

EXAMPLE 7

1. Preparation of the modified titanium trichloride

The procedure of Example 1-(1) was followed.

2. Three-step copolymerization (polymerization of propylene for the first step, co-polymerization of a small amount of ethylene and propylene for the second step, and co-polymerization of ethylene and propylene for the third step)

A 100-l. stainless steel autoclave provided with stirring means and temperature controlling means was charged with heptane at a rate of 11 l./hour and the premixed catalyst slurry (consisting of AlEt$_2$Cl at a rate of 20 g./hour, titanium-containing solid product identical to that of Example 1 at a rate of 10 g./hour and heptane at a rate of 5 l./hour). Then, propylene and a small amount of hydrogen were fed, and the polymerization was carried out continuously at 65° C under a pressure of 6.5 kg/cm$^2$ G so that the concentration of the polymer in the polymer slurry would be 27 to 31% by weight.

Then, the polymerization product under the above conditions was continuously fed into the second reactor of 100-l. capacity. In the second reactor, propylene, ethylene in an amount corresponding to 2.0 mole % based on the total amount of propylene fed, and a small amount of hydrogen were introduced so that the polymer concentration of the polymer slurry would be 34 to 38% by weight.

Further, the polymerization product was continuously fed into the third reactor of 100-l capacity, in which continuous polymerization was effected at 65° C with the feeding of ethylene in an amount corresponding to 5.0% by mole based on the total amount of propylene fed so that the concentration of the polymer in the polymer slurry would be 38 to 42% by weight.

Then, butanol was added at a rate of 0.5 ./hour to the polymerization reaction product continuously removed from the third reactor thereby to terminate the reaction. After this treatment the polymer slurry was separated from the solvent by a centrifugal separator, and then dried, 650 g. of a white polymer per gram of the titanium compound was obtained.

The total II of the polymer was 79.5%, and the MI was 6.5. The ethylene content was 3.4% by weight.

EXAMLE 8

1. Preparation of the modified titanium trichloride

The precedure of Example 1-(1) was followed.

2. One-step co-polymerization (co-polymerization of a small amount of ethylene and propylene)

A 100-l. stainless steel autoclave provided with stirring means and temperature controlling means was charged with heptane at a rate of 4 l./hour and the premixed catalyst slurry (consisting of AlEt$_2$Cl at a rate of 12 g./hour, solid product identical with that of Example 1 at a rate of 6 g./hour, and heptane at a rate of 4 l./hour), and then the polymerization was carried out continuously at 60° C under a pressure of 6 kg./cm$^2$ G with the feeding of propylene and ethylene with a mole ratio of 100 : 3.4 and a small amount of hydrogen.

Butanol was then added at a rate of 0.3 l./hour to the polymerization reaction product continuously removed from the autoclave thereby to terminate the reaction. After this treatment the polymer cake was separated from the solvent by a centrifugal separator, and then dried, 540 g./hour of a white solid polymer per gram of titanium compound was obtained.

The total II and MI of the polymer were 71.2% and 9.0, respectively, and the ethylene content was 2.0%.

We claim:

1. A process for producing crystalline propylene polymers which comprises polymerizing propylene in the presence of a catalytic system comprising, in combination, (1) an organoaluminum compound and (2) a modified titanium composition prepared by mill processing for at least one hour (a) a titanium trichloride and (b) methyl methacrylate, the weight ratio of compound (b) to compound (a) being 0.01 to 0.3:1.

2. A process for producing crystalline propylene polymers as claimed in claim 1 in which said organoaluminum compound is at least one compound representable by the general formula Al R$_n$X$_{3-n}$, wherein R is a member selected from the group consisting of alkyl and aralkyl groups, X is a member selected from the group consisting of halogens and alkoxy groups, and n is any one of the numerical values 3, 2, 1.5, and 1.

3. A process for producing crystalline propylene polymers as claimed in claim 1 in which the ratio by weight of the quantities of said compounds (1) and (2) is of the order of from 0.5 to 20:1.

4. A process for producing crystalline propylene polymers as claimed in claim 1 in which said ratio of compound (b) to compound (a) is 0.03 to 0.2:1.

5. A process for producing crystalline propylene polymers as claimed in claim 1 in which the polymerization is carried out in a gas phase.

6. A process for producing crystalline propylene polymers as claimed in claim 1 in which the polymerization is carried out in the presence of at least one inert solvent selected from the group consisting of aliphatic, and aromatic hydrocarbons.

7. A process for producing crystalline propylene polymers as claimed in claim 1 in which the polymerization is carried out in a medium consisting essentially of liquefied propylene.

8. A process for producing crystalline propylene polymers as claimed in claim 1 in which said crystalline propylene polymers are homopolypropylenes.

9. A process for producing crystalline propylene-ethylene copolymers each having ethylene contents less than 10% by weight of the copolymer which comprises copolymerizing propylene and ethylene in the presence of a catalytic system, comprising in combination, (1) an organoaluminum compound and (2) a modified titanium composition prepared by mill processing for a period of at least 1 hour (a) a titanium trichloride and (b), methyl methacrylate, the weight ratio of compound (b) to compound (a) being 0.01 to 0.3:1.

10. A process for producing crystalline copolymers as claimed in claim 9 in which said organoaluminum compound is at least one compound representable by the general formula $AlR_nX_{3-n}$, wherein R is a member selected from the group consisting of alkyl and aralkyl groups, X is a member selected from the group consisting of halogens and alkoxy groups, and $n$ is any one of the numerical values 3, 2, 1.5, and 1.

11. A process for producing crystalline copolymers as claimed in claim 9 in which the ratio by weight of the quantities of said compounds (1) and (2) is of the order of from 0.5 to 20:1.

12. A process for producing crystalline copolymers as claimed in claim 9 in which said ratio of compound (b) to compound (a) is 0.03 to 0.2:1.

13. A process for producing crystalline copolymers as claimed in claim 9 in which the polymerization is carried out in a gas phase.

14. A process for producing crystalline copolymers as claimed in claim 9 in which the polymerization is carried out in the presence of at least one inert solvent selected from the group consisting of aliphatic, and aromatic hydrocarbons.

15. A process for producing crystalline propylene polymers as claimed in claim 9 in which the polymerization is carried out in a medium consisting essentially of liquefied propylene.

* * * * *